United States Patent

[11] 3,623,015

[72] Inventors Herbert E. Schmitz
Amherst;
Kenneth D. Labaugh, Nashua, both of N.H.

[21] Appl. No. 861,668
[22] Filed Sept. 29, 1969
[45] Patented Nov. 23, 1971
[73] Assignee Sanders Associates, Inc.
Nashua, N.H.

[54] STATISTICAL PATTERN RECOGNITION SYSTEM WITH CONTINUAL UPDATE OF ACCEPTANCE ZONE LIMITS
17 Claims, 5 Drawing Figs.

[52] U.S. Cl. .......... 340/172.5, 340/146.2, 340/146.3 T
[51] Int. Cl. .......... G06f 7/02, G06f 15/18
[50] Field of Search .......... 235/157; 340/172.5, 146.3, 146.2

[56] References Cited

UNITED STATES PATENTS

| | | | |
|---|---|---|---|
| 2,951,235 | 8/1960 | Welsh | 340/172.5 |
| 3,191,149 | 6/1965 | Andrews | 340/172.5 X |
| 3,209,328 | 9/1965 | Bonner | 340/172.5 |
| 3,319,229 | 5/1967 | Fuhr et al. | 340/172.5 |
| 3,344,406 | 9/1967 | Vinal | 340/172.5 |
| 3,374,470 | 3/1968 | Rohland | 340/172.5 |
| 3,457,552 | 7/1969 | Asendorf | 340/172.5 |
| 3,521,235 | 7/1970 | Becker | 340/172.5 X |

OTHER REFERENCES

Chow, C. K.; Adaptive Pattern Recognition, In I.B.M. Technical Disclosure Bulletin; Vol. 11, No. 11, April, 1969; pp. 1598- 1600; 340/172.5.

*Primary Examiner*—Gareth D. Shaw
*Assistant Examiner*—Melvin B. Chapnick
*Attorney*—Louis Etlinger

ABSTRACT: A pattern recognition system which employs three similar addressable memories. Data representing an upper limit distribution pattern of a series of measurements on a particular parameter is stored in one memory, while data reflecting a lower limit distribution pattern of the measurements on the same parameter is contained in the second memory. Then new data reflecting additional parameter measurements is loaded into the third memory and compared with the data in the other two memories to see if this new data "-fits" within the acceptance zone defined by the upper and lower limit patterns. If there is a fit, then the system emits a recognition signal which indicates that the additional parameter measurements belong to the same parameter set which established the original upper and lower limit patterns. Following this, the upper and lower limit patterns contained in the first and second memories are updated to include the new data, and then more parameter measurements are made and compared with the updated acceptance zone. This process continues with still more incoming measurement data so that the upper and lower limit patterns are continually modified to accommodate long term changes in the pattern to be recognized.

INVENTORS
HERBERT E. SCHMITZ
KENNETH D. LABAUGH
BY John S. Solakian
ATTORNEY

INVENTORS
HERBERT E. SCHMITZ
KENNETH D. LABAUGH

BY John S. Solakian

ATTORNEY

STATISTICAL PATTERN RECOGNITION SYSTEM WITH CONTINUAL UPDATE OF ACCEPTANCE ZONE LIMITS

BACKGROUND OF THE INVENTION

This invention relates to a pattern recognition system. It relates more particularly to a system which recognizes distribution patterns on the basis of a past history of a set of events.

The present system has application where it is desirable to recognize the statistical distribution of a set of parameters. For example, one may wish to obtain an indication of the distribution pattern of pulse intervals in a given signal. In another situation, it may be desired to accumulate a statistical distribution of the values of a group of resistors or other electrical components. In still another case, one may want to ascertain the traffic load pattern at a given location at a certain time of day.

Also, it is often desirable to know when parameters being measured belong to a known set of parameters whose distribution pattern has already been obtained. For example, one may want to establish whether a given signal being received is Morse code. If the signal is coded, then its pulse intervals (dot, dash and space) bear certain substantially fixed relationships to one another. Therefore, by comparing the distribution pattern of the pulse intervals of an unknown signal with the corresponding pattern produced by a known Morse code signal, one may determine whether or not the unknown signal is also Morse code.

Of course, the identification of the unknown signal is readily made if the two distribution patterns are identical. However, as a practical matter, even the patterns produced by two identical Morse code messages may not be the same. This may be due to the fact that the two signals are sent by different people having a different key "touch." On the other hand, it may be due to noise and other such factors which distort the incoming signal. Therefore, to be really effective, it is essential that the recognition system take into account the fact that the incoming data may be distorted in this fashion and contain anomalies which partially mask its true makeup.

SUMMARY OF THE INVENTION

This invention aims to provide a pattern recognition system which gives a visible indication of the statistical distribution pattern of a set of parameters.

Another object of the invention is to provide a pattern recognition system which is able to handle a relatively large number of parameter samples and so yields a relatively accurate distribution pattern.

Still another object of the invention is to provide a pattern recognition system which is able to identify an unknown series of events as belonging to a previously established known set of events.

Another object of the invention is to provide a pattern recognition system capable of providing distribution patterns of sets of parameters and detecting similarities between the sets on a statistical basis.

Still another object of the invention is to provide a pattern recognition system which develops a distribution pattern of a set of events, even though the input data contains a relatively large amount of noise.

A further object of the invention is to provide a recognition system which is continually updated to accommodate long term changes in the pattern to be recognized.

The invention accordingly comprises the features of construction, combination of elements and arrangement of parts which will be exemplified in the construction hereinafter set forth and the scope of the invention will be indicated in the claims.

In general, the present system develops and displays distribution patterns of events. For purposes of illustration, we will describe a system capable of generating distribution patterns of pulse intervals in different incoming signals. By "interval" is meant pulse duration as well as the intervals between successive pulses. The system also compares these different distribution patterns on a statistical basis to determine whether the signals have a common genesis or the extent to which their pulse interval distribution patterns are similar to the pulse interval distribution pattern produced by a known signal. As such, the illustrated apparatus may be used to identify a particular incoming electrical signal as Morse code, even though the signal contains a certain amount of noise.

The present apparatus measures the pulse intervals in an incoming electrical signal by counting the number of clock pulses which occur between successive zero-axis crossings of the incoming signal and storing this information in a multiaddress memory. Each address corresponds to a given interval and the number stored in the address is the number of times that interval has occurred. Thus, each memory address functions as an accumulator. For example, if 10 clock pulses are counted during a given time interval, a "1" is stored at address 10 in the memory; if the next interval is 15 clock pulses long, a "1" is stored in memory address 15; the next time that 10 clock pulses are counted during a given interval, the number stored at address 10 is increased by one to "2," and so on.

In this fashion, the system measures the durations of all the time intervals in the incoming signal and appropriately increments the counts at the various addresses in the memory. After a large number of such measurements, a distribution pattern or profile of the pulse intervals in the incoming signal is contained in the memory. Upon command, this data can be read out and converted to an analog voltage for driving an electronic display to yield a visual presentation of the pattern or profile.

The apparatus of the invention may simultaneously handle many independent pattern parameters, one at each memory address. Thus, the acceptance zone at each memory address would be independent of each other.

In this illustration, we will assume that this first measured signal is a known Morse code signal generated by a particular individual. Therefore, the system displays a distribution pattern which reflects the pulse durations and intervals corresponding to the dots, dashes and spaces in the code. Typically, the duration of a dash is three times the duration of a dot and the duration of a space is five times the duration of a dot. Therefore, the 1—3—5 relationship should predominate in the distribution pattern displayed by the system.

Once the first pattern is established in the memory, it is then loaded into two other similar memories; namely, an upper limit memory and a lower limit memory. Then the pulse intervals in an unknown signal are measured by the system and loaded into the first memory in the same way described above. This pattern will ordinarily differ to some extent from the first pattern (i.e., the pattern produced by the Morse code signal), due to noise (as broadly defined). The pattern contained in the upper limit memory is then modified so that it conforms to the maximum values of the two distribution patterns thus far obtained, and the pattern in the lower limit memory is modified so that it conforms to the minimum values of the two patterns. As more and more measurements are made on the signals, the data in the latter two memories take on the form of patterns of the upper and lower limits of the pulse interval distributions. Accordingly, they define between them an acceptance zone or template within which most of the measure intervals fall. This data in the upper and lower limit memories is displayed along with the information in the first memory. The apparatus of the invention might also develop upper and lower limits which are a given percentage or incremental value of the peak values of the signals.

If the distribution pattern developed by the succession of unknown signals fits within the acceptance zone produced by the Morse code signal in the example, then it is substantially established that the unknown signals are also Morse code. On the other hand, if the pattern bears little or no resemblance to the acceptance zone, then the unknown signals are obviously not Morse code signals. Since the use of distribution patterns requires the summation of a fairly large number of measurements, the system works essentially with averages of the measured parameters. For this reason, the pattern of the incoming signal can still be recognized, even though the signal contains noise. That is, assuming that a reasonable number of measurements are made, the 1—3—5 relationship between the dot, dash and space components of a Morse code signal should still be evident in the established distribution pattern.

The apparatus adapts itself continuously and dynamically according to the new information received by it to accommodate long term changes in the measured parameter. That is, the upper and lower limit distribution patterns in the memories gradually decay so as to conform to contractions in the input patterns. Thus, each new series of measured parameters is compared with an updated acceptance zone so that a "fit" should be achieved even though there may have been a long term change in the parameter being measured. In the Morse code example, such a change might occur due to operator fatigue.

The limit patterns, once having been established by a given number of input signals, might be frozen for further input signals which do not fall within a given percentage of the acceptance zone. For example, if the input signals are less than plus or minus 20 percent out of the acceptance zone already established, then only these signals may improve the acceptance zone. Conversely, these signals might have no modifying function, i.e., the acceptance zone might be frozen to them and unfrozen to input signals beyond plus and minus 20 percent.

DESCRIPTION OF THE PREFERRED EMBODIMENT

Figure 1:
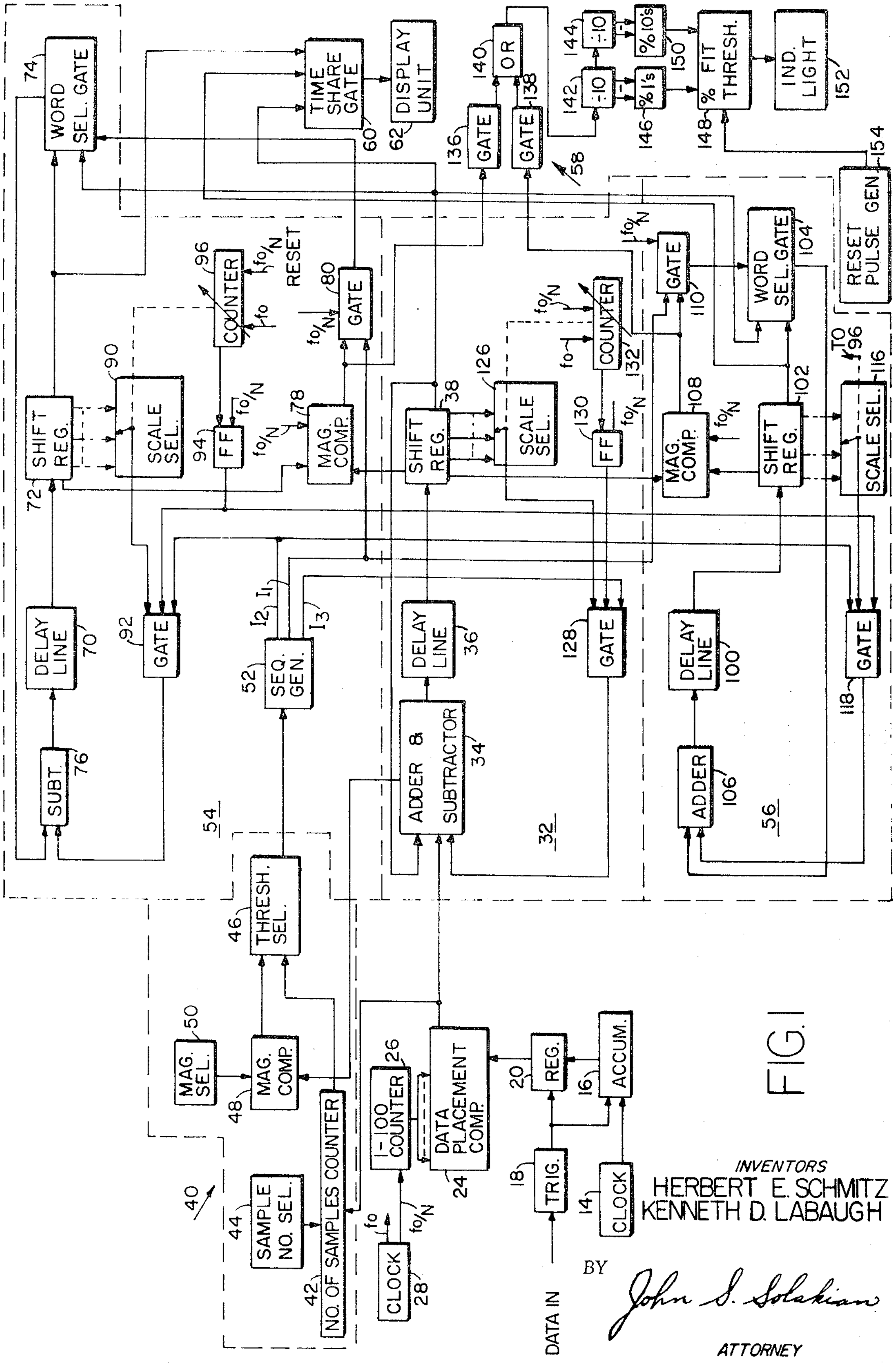
FIG. 1 is a block diagram of a pattern recognition system embodying the principles of the invention.

Referring now to FIG. 1 of the drawings, the system measures pulse intervals in terms of pulses from a clock 14. That is, the input signal being evaluated is applied to a trigger 18. Upon the occurrence of the first zero axis crossing in the input signal marking the beginning of the first pulse, trigger 18 emits a RESET pulse to an accumulator register 16 which then commences counting pulses from clock 14. Upon the occurrence of the next axis crossing in the input signal marking the end of this pulse, trigger 18 again resets accumulator 16 and also loads its contends into a register 20.

Thus, for example, if the first pulse in the input signal has a duration of 53 clock pulses, the number 53 is stored in register 20. Also, upon the occurrence of the second trigger 18 pulse, accumulator 16 again begins counting clock 14 pulses in order to measure the length of the interval following the first pulse in the input signal.

A data placement comparator 24 compares the contents of register 20 with the contents of a recirculating count-of100 counter 26 which counts pulses from a clock 28. Whenever the count in counter 26 equals the number contained in register 20, comparator 24 emits an output pulse to a multiaddress memory indicated generally at 32.

Memory 32 is a recirculating memory comprising an ADDER and SUBTRACTER 34, a delay line 36 and a shift register 38 connected in a loop. In this example, the memory 32 has 100 memory addresses, each of which has a capacity of N bits.

The memory addresses are designated in order by the numbers 1 to 100 and each address corresponds to a pulse interval count equal to the number of that address. Thus, address number 53 corresponds to a pulse interval of 53 clock 14 pulses. Each address stores the number of times the corresponding pulse interval has occurred. Thus, the first time the pulse interval 53 occurs, a "1" is entered into address 53. The next time this interval occurs, a "1" is added to the contents of address 53, and the address the contains a "2" (binary 10). Each succeeding time the same interval occurs, the contents of that address are augmented by one.

Accordingly, each address in the memory 32 is an accumulator for the corresponding pulse interval and the memory 32 therefore contains a distribution or pattern of the pulse intervals 1—100. As will be seen, this pattern can be displayed for visual comparison with other patterns or it can be compared electrically to determine the degree of correlation with the other patterns.

More specifically, the memory 32 shifts individual bits in response to an output of the clock 28 having the frequency $f_o$. The counter 26 is indexed at the rate $f_o$/N, so that the content of the counter changes as each address passes a given point in the memory 32. Thus, the counter contents are used to identify the successive addresses that are accessible externally of the memory 32, e.g., in the ADDER (SUBTRACTER) 34. Accordingly, in the foregoing example, comparator 24 will emit an output pulse as memory address number 53 passes through the ADDER (SUBTRACTER) 34 and this pulse will increment the contents of that memory address, as described above.

In this fashion, memory 32 accumulates at its different addresses the number of occurrences of each different measured pulse interval in the input signal. Thus, it contains a distribution pattern or profile of all the pulse intervals in the input signal. In the illustrated embodiment, memory 32 can handle up to $2^{10}$ occurrences of each of 100 different time intervals. As such, the system is capable of developing a relatively accurate distribution pattern of the measured parameter.

The memories could store more than the 100 different time intervals by simply making the memory capacities larger or by utilizing a clocking technique as described in the following pending applications whose Ser. Nos. are 731,003, now Pat. No. 3,566,095, and 777,809; are entitled "Basic Time Interval Integrator" and "Logarithmic Clock," filed on May 22, 1968, and Nov. 21, 1968, respectively; and are assigned to the assignee of the present application. The system of both applications generate clock pulses on a gradually expanding time scale so that there are proportionally fewer output pulses for the longer intervals in the signals being examined. Specifically, the first mentioned application describes a system which generates the clock pulses at intervals of occurrence proportional to the square root of the number of linear clock pulses elapsed between the axis crossings of the input signal, and the second mentioned application describes a system which generates the clock pulses at intervals proportional to a logarithm of the number of linear clock pulses between the axis crossings of the input signal. If either of these two nonlinear timing arrangements is used, the aforementioned 100 "-bin" system for measuring pulse intervals will have a substantial increase in dynamic range. Thus, an operator can use the total system to recognize signals which may vary very widely in absolute time duration, but which maintain fixed relationships with one another.

When an adequate distribution pattern is built up in memory 32, this fact is sensed by a threshold control section indicated generally at 40. Depending upon the particular application, the thresholding may take place either after a selected number of samples have been measured by the system, or after the system has measured a selected number of occurrences of a given time interval.

More particularly, a number-of-samples-counter 42 counts the number of pulses from data placement comparator 24, with each pulse representing a sample measurement. When the count in counter 42 reaches a selected value, as determined by the setting of a sample number selector 44, counter 42 emits an output pulse to a threshold selector 46.

Selector 46 is, in reality, a two-position switch whose other input is derived from a magnitude comparator 48. It should be understood that selector 46 could be a three-position switch, wherein the third position gives manual control for system operation by human operator. Comparator 48 is a serial comparator which compares bit-by-bit each number passing through ADDER (SUBTRACTER) 34 (i.e., the measured number of occurrences of each time interval in the monitored signal), with an arbitrary number set into a magnitude selector 50. When the two are equal, comparator 48 emits an output pulse to threshold selector 46.

Depending upon the setting of selector 46 (i.e., when a selected number of samples has been measured or when a selected number of occurrences of particular time interval has been detected), selector 46 emits an energizing pulse to a sequence generator 52 which then commences developing three successive timing signals $I_1$, $I_2$ and $I_3$. Each of these three timing signals lasts for a time interval equal to one complete circulation system (i.e., 100 $N/f_o$) and each consists of a voltage level which persists for one such complete cycle.

Still referring to FIG. 1, upon the occurrence of the $I_1$ timing signal, the distribution pattern contained in memory 32 is compared with upper and lower limit distribution patterns of a series of pulse interval measurements contained in a pair of similar memories 54 and 56, respectively, to see if this pattern "fits" within the acceptance zone or template defined by the upper and lower limit patterns. If there is a fit, then an indicating section shown generally at 58 signals the operator that the measured signal belongs to the same set which established the upper and lower limit patterns.

Figure 2A:
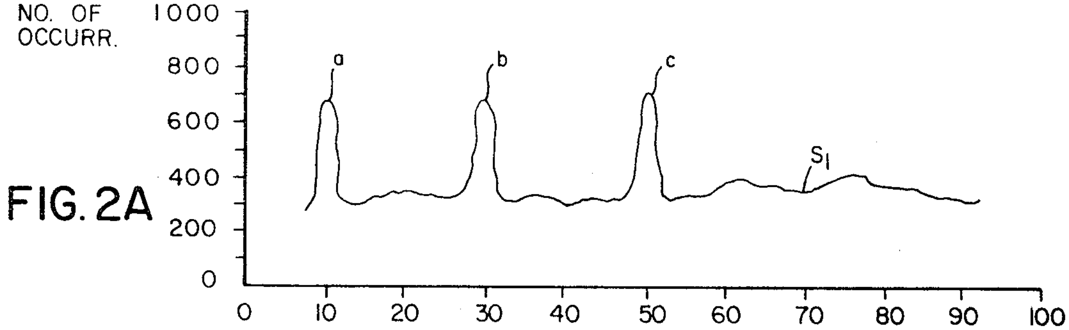
FIGS. 2A—2D illustrate a series of distribution patterns developed by the FIG. 1 system.
Figure 2B:
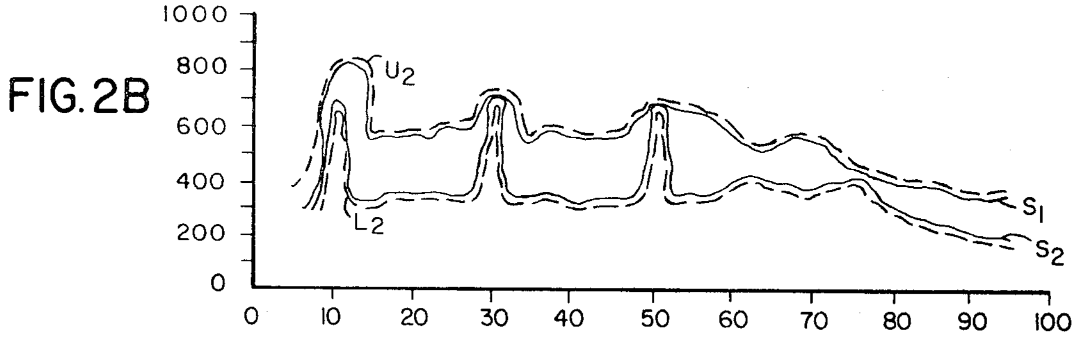
Figure 2C:
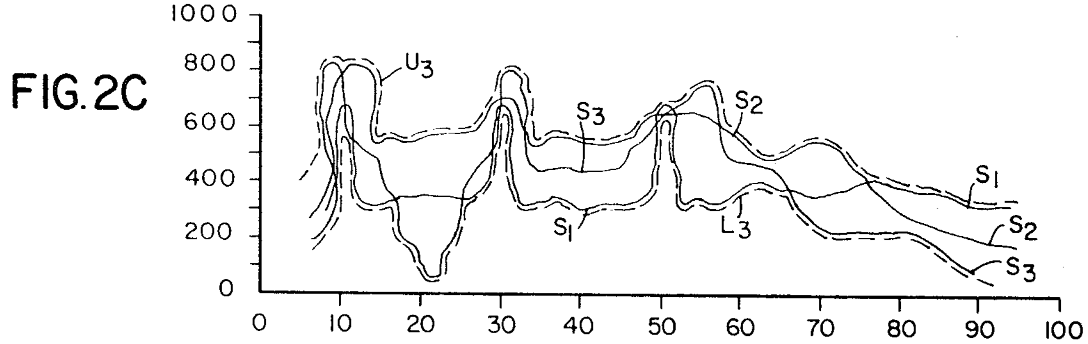

For example, FIG. 2C shows the upper and lower distribution patterns $U_3$ and $L_3$ as might be contained in memories 54 and 56, respectively. Together they define between them an acceptance zone indicated by the area between the dashed lines. The acceptance zone contains peaks at times 10, 30 and 50, indicating that it was formed by Morse code signals. Curve $S_2$ shows a typical pattern as might be contained in memory 32. As seen from the figure, curve $S_2$ fits within the acceptance zone so that the signal which produced it is in all probability also a Morse code signal.

Also, during the cycle of the system when the $I_1$ timing signal is present, the upper and lower limit distribution patterns contained in memories 54 and 56 are updated to include the pattern contained in memory 32. More particularly, the numbers at the corresponding addresses of memories 32 and 54 are compared and the contents of the memory 54 address are made to conform to the greater of the two numbers. Similarly, the numbers at the corresponding addresses of memories 32 and 56 are compared and the contents of memory 56 address are made to conform to the lesser of the two numbers. In this fashion, the limit patterns in memories 54 and 56 are expanded to conform to expansions in the input patterns in memory 32.

During the next cycle of the system, when the $I_2$ timing signal is present, the content of each address in the upper limit memory 54 is decremented by a fraction and the content of each address in lower limit memory 56 is incremented by the same fraction, so that the limit patterns contained in these memories decay by a selected fraction, thereby contracting the acceptance zone. This is equivalent to the exponential decay in an analog averaging circuit and, in effect, it causes the memories 54 and 56 to carry time-weighted averages of the maximum and minimum values in the input patterns. Moreover, it allows the limit patterns to contract in correspondence with long term contractions in the input patterns.

Finally, during the third cycle of the system, when the $I_3$ timing signal is present, memory 32 is decremented completely or by a selected fraction so that a fresh comparison is made for each new series of monitored signals.

Thus, the system adapts itself dynamically to changing input data. Each new series of measured parameters is compared with an updated acceptance zone so that a "fit" may be achieved even though there are long term changes in the measured pulse intervals due to operator fatigue and the like.

Referring to FIG. 1, the data contained in memories 32, 54 and 56 is read out periodically by way of a time share gate 60 to a display unit 62. Unit 62 comprises the usual buffer registers and a digital-to-analog converter which converts the contents of the successive addresses in the memories 32, 54 and 56 to analog signals which drive a conventional cathode-ray tube. Thus, display unit 62 yields a visual presentation of the distribution patterns contained in the three memories.

FIGS. 2A—2C illustrate typical displays. The successive figures trace the buildup from zero of the distribution patterns in the system memories. They also illustrate the acceptance zone defined by the upper and lower limit patterns, as well as the changes in that zone which occur due to measurements on four successive series of input signals.

More particularly, FIG. 2A illustrates a curve $S_1$ which represents the distribution pattern produced by a known Morse code signal. Curve $S_1$ has three peaks, a, b and c which correspond to time intervals of 10, 30 and 50 clock 14 pulses. During the first $I_1$ timing signal following thresholding, the $S_1$ pattern is transferred to memories 54 and 56 and a new distribution pattern is then built up in memory 32. This new pattern is represented by curve $S_2$ in FIG. 2B. Curve $S_2$ also has protuberances or peaks at times 10, 30 and 50, indicating that it, too, was produced by a Morse code signal. Upon the occurrence of the second $I_1$ timing signal after thresholding, the system compares the $S_1$ and $S_2$ patterns and develops an upper limit distribution pattern which contains the maximum values of the patterns $S_1$ and $S_2$. This is indicated by the curve $U_2$ in FIG. 2B. Similarly, the system develops a lower limit distribution pattern shown by curve $L_2$ which represents the minimum values of the two patterns $S_1$ and $S_2$. The two curves $U_2$ and $L_2$ define between them an acceptance zone or template indicated by the area between the dashed lines in FIG. 2B.

Additional measurements of the input signal give rise to a third distribution pattern indicated by curve $S_3$ in FIG. 2C. During the third distribution pattern indicated by curve $S_3$ in FIG. 2C. During the third timing signal $I_1$ following thresholding, the system compares the new pattern $S_3$ to see if it fits within the acceptance zone defined by the upper and lower patterns $U_2$ and $L_2$. In this case, the $S_3$ pattern fits within the acceptance zone so that it, too, was in all probability produced by a Morse code signal.

The acceptance zone defined by the upper and lower limit patterns $U_2$ and $L_2$ is then updated to include the new pattern $S_3$ so that the upper and lower limit patterns become as shown by curve $U_3$ and $L_3$ in FIG. 2C. A comparison of FIGS. 2B and 2C shows that the acceptance zone has changed shape to accommodate the new measurements on the input data.

Figure 2D:
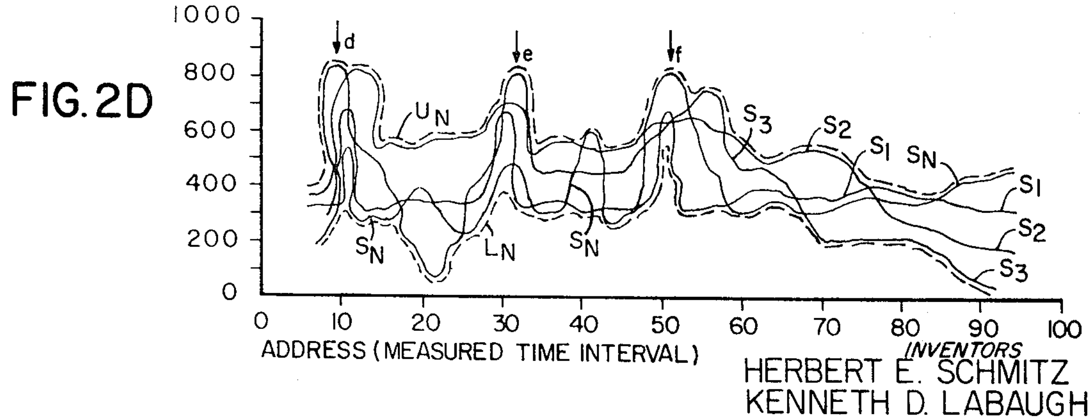

Additional measurements on the input signal result in further modifications of the upper and lower limit patterns as shown by curves $U_N$ and $L_N$ in FIG. 2D. Thus, the acceptance zone indicated by the areas between the dashed lines FIGS. 2B—2D is expanded with time to conform to long term changes in the input signal.

In the curves shown in FIG. 2A—2D the respective dot, dash and space peak signals fall in their respective addresses of 10, 30 and 50 measured time intervals. The speed of an operator might cause a change in the measured time intervals of the 1—3—5 relationship. For example, a slower operator might take a measured time interval of 20 clock pulses to send a dot, 60 pulses to send a dash and 100 pulses to send a space. Although there remains a 1—3—5 relationship, the peaks are now displaced. In order to normalize these peaks so that they will occur at the same measured time interval regardless of the speed of the operator, an adaptive clock can be used. An adaptive clock would generate the clock pulses at a rate which would be dependent on the speed of the operator, i.e., the zero axis crossovers of the input signal. A slow operator would generate less adaptive pulses but because he also generates longer intervals the number of pulses in a given interval will be the same as that for a faster or slower operator. Of course, information as to an operator's relative speed will be lost.

In combination with the adaptive clock, one could combine the logarithmic or square root clock referenced hereinbefore. This would compensate for differences in an operator's speed as well as improve the dynamic range of the system.

Referring again to FIG. 1, memory 54 comprises a delay line 70 and a shift register 72. Memory 54 circulates in synchronism with memory 32 in response to pulses from clock 28. Data is loaded into delay line 70 by way of a word select gate 74 and a subtracter 76, the data from gate 74 constituting the minuend in the subtracter. Gate 74 has two positions: in one position it recirculates the contents of shift register 72 back to delay line 70; in its other position it passes the contents of shift register 38 in memory 32 to delay line 70.

Memories 32 and 54 are driven in unison so that the contents of their respective corresponding addresses are contained in registers 38 and 72 at the same time. A magnitude comparator 78 which receives $f_o$/N timing pulses from clock 28 compares the contents of these two registers. If the number contained in register 38 is greater than the number in register 72, then upon the occurrence of an $f_o$/N timing pulse, comparator 78 emits a switching signal to gate 74 by way of a gate 80. Gate 80 is enabled by the coincidence of an $I_1$ timing signal and a trigger signal $f_o$/N from clock 28. When these occur, a switching signal from comparator 78 will switch the word select gate 74 to its second position, so that it loads the number contained in register 38 into an address in memory 54 in place of the number previously contained in that address. On the other hand, if the number in register 38 is less than, or equal to, the number in register 72, then word select gate 74 remains in its first position so that the contents of register 72 are recirculated.

The same procedure is followed with the next corresponding pair of memory addresses passing through registers 38 and 72. That is, comparator 78 compares the contents of these addresses and, if the number in register 38 is larger, this larger number is loaded into memory 54 in place of the number formerly contained at that memory address.

In this fashion, the system compares the contents of memory 32 and upper limit memory 54 address-by-address and modifies the contents of the upper limit memory to correspond to the larger of the two numbers being compared at each pair of addresses. Thus, after one complete memory cycle of the system, memory 54 contains a distribution pattern reflecting the maximum values of the two patterns contained in memories 32 and 54.

During the next memory cycle, the presence of the $I_2$ timing signal initiates the decrementing process in the upper limit memory 54. More particularly, a scaling selector 90 is adjusted manually to periodically subtract a certain fraction of the number contained in each address in memory 54. It does this applying to a subtracter 76 in seriatim a selected number of the most significant bits of each number contained in shift register 72. These bits, which are applied to subtracter 76 by way of a gate 92, are subtracted from a corresponding number of the least significant bits in that number. The setting of scaling selector 90 determines the register 72 stage from which the subtrahend bits are gated to subtracter 76.

Gate 92 is enabled by the coincidence of the $I_2$ timing signal and the "set" output of flip-flop 94. Flip-flop 94 is set by each $f_o$/N pulse from clock 28, i.e., each time a complete memory address is contained in register 72.

Selector 90 is also tied to a counter 96 which counts $f_0$ pulses from clock 28. When counter 96 reaches its maximum count, it resets flip-flop 94, and thereby disables gate 92, after a selected number of bits have been fed to subtracer 76. The capacity of counter 96 may be adjusted so that the number of bits fed to subtracter 76 is varied from a minimum of one to a maximum corresponding to the total number of stages in register 72. Counter 96 is also reset by an $f_o$/N pulse at the beginning of each counting cycle so that it commences a new count as each new memory address completes its shift into register 72.

Assume that selector 90 is in one extreme position of adjustment wherein a bit is taken from the most significant stage of register 72 (i.e., the stage at the left end of the register), and counter 96 emits an output pulse after one $f_o$ pulse from clock 28, corresponding to a one bit shift in register 72.

Upon the occurrence of each $f_o$/N pulse from clock 28, register 72 contains a complete memory address, the most significant bit in the address being in the first register stage (left end) and the least significant bit being in the last stage (right end). The next $f_0$ pulse following the $f_o$/N pulse from clock 28 shifts the least significant bit in register 72 to subtracter 76 as the minuend, while at the same time, the most significant bit is applied to the subtracter as the subtrahend by way of gate 92. Thus, the output of subtracter 76 is the original number contained in register 72 less the value of the most significant bit.

Assume, for example, that each memory address has a capacity of six bits and that the binary number contained therein is 100011, corresponding to the number 35. With the above setting of selector 90, subtracter 76 subtracts the most significant bit in that number, i.e., a "1," from the least significant bit, i.e., also a "1" (corresponding to the number 1), so that the binary number read out of subtracter 76 is 100010, corresponding to the difference number 34.

With the next selector 90 setting, data is drawn from the second most significant register stage and counter 96 disables gate 92 after two $f_0$ pulses from clock 28, corresponding to a two bit shift in register 72. In this example, the two most significant bits in the above binary number (100011) contained in register 72, i.e., "10," corresponding to the number 2, are subtracted from the two least significant bits in the same memory address so that the binary number shifted out of subtracter 76 becomes 100001, i.e. the difference number 33.

Selector 90 can, of course, be adjusted all the way to its other extreme position so that data is read out of the least significant register 72 stage. In this event, assuming again a six bit word length, counter 96 disables gate 92 after six $f_0$ pulses corresponding to a six bit shift in register 72. In this event, the binary number applied by way of gate 92 to subtracter 76 consists of the entire number contained in register 72, e.g., 100011, so that the output of subtracter 76 is 000000, i.e., the number 0. With this setting of selector 90, then, the entire contents of memory 54 are erased after one complete circulation of the memory. In actual practice, selector 90 is adjusted to decrement memory 54 by a relatively large fraction so that measurements on the more recent incoming signals will predominate in the distribution pattern contained therein.

It will be appreciated from the foregoing then that memory 54 can be adjusted so that the distribution pattern stored therein decays completely or at a selected rate, unless it is reinforced by additional incoming data from memory 32. This adapts or updates the upper limit pattern to long term changes in the input signals being measured.

Memory 56 functions in much the same way as memory 54, except that it develops a lower limit distribution pattern. Memory 56 comprises a delay line 100 and a shift register 102. Data is loaded into delay line 100 by way of a two-position word-select gate 104 and an ADDER 106.

A magnitude comparator 108 compares the contents of registers 38 and 102 address-by-address in exactly the same fashion as magnitude comparator 78 described above. When the number contained in register 38 is less than the number in register 102, comparator 108 emits a switching signal via a gate 110 to word select gate 104. The presence of the $I_1$ timing signal from generator 52, together with an $f_o$/N pulse from clock 28, causes gate 110 to trigger word select gate 104, which then loads the contents of register 38 into delay line 100 in place of the contents of register 102. Of course, if the number in register 38 is greater than, or the same as, the number at the same address in register 102, then the contents of the latter register are recirculated.

The contents of memory 56 are preferably incremented in the same fashion described above in connection with the decrementing of the contents of memory 54. That is, a manual scale selector 116 loads data from a selected stage of register 102 by way of a gate 118 to ADDER 106. Gate 118 is also controlled by the output of flip-flop 94 to switch on and switch off at the same time as does gate 92. In this way, memory 56 can be adjusted to eliminate a certain percentage of the number contained in each of its memory addresses in the same fashion described above in connection with memory 54.

Unlike the case in memory 54, however, the fractional number which is gated out of register 102 is added to the number in that register by ADDER 106. This is because the lower limit data in memory 56 decays in the positive sense. That is, the decay in memory 56 takes place in the positive direction so that the lower limit pattern therein draws closer and closer to the upper limit pattern contained in memory 54.

Still referring to FIG. 1, during the third cycle of the system after thresholding, the $I_3$ timing signal from generator 52 initiates the same sort of decay process in memory 32. More particularly, a scaling selector 126 is adjusted manually to apply a selected number of the most significant bits of each number contained in register 38 in seriatim by way of a gate 128 to (ADDER) SUBTRACTER 34 where they are subtracted from a corresponding number of the least significant bits in that number. Gate 128 is enabled by the coincidence of an $I_3$ signal from generator 52 and the "set" output of flip-flop 130. Flip-flop 130 is set by the $f_o/N$ pulses from clock 28 and is reset by a pulse from a counter 132 which receives $f_0$ and $f_o/N$ pulses from clock 28 and is controlled by selector 126. Counter 132 operates in exactly the same way as counter 96 described above.

That is, just after each complete memory address is contained in register 38, a selected fraction of it is applied as the subtrahend to (ADDER) SUBTRACTER 34, where it is subtracted from the number applied as the minuend by way of gate 128.

Thus, after three cycles of the system memories following thresholding, the pattern contained in memory 32 has been compared with the upper and lower limit patterns contained in memories 54 and 56 to see whether it "fits" within the acceptance zone defined by those limit patterns. If a "fit" is achieved, then section 58 signals the operator of that fact. At the same time, the two patterns are updated with the pattern contained in memory 32 so as to expand the acceptance zone defined by the two limit patterns. Following this, the contents of memories 54 and 56 are incrementally decayed to cause a contraction in the acceptance zone and, finally, the contents of memory 32 are decremented either partially or completely in readiness for a new distribution pattern representing another series of measurements on the input signal.

It will be appreciated that appropriate delays are built into the various components of the present system to alleviate any timing and race problems and that the various components are synchronized in the usual way by timing pulses from clock 28. However, for reasons of clarity, we have not specifically illustrated these provisions in the drawings.

Indicating section 58 tells when a selected percentage of the measured time intervals in an incoming signal "fit" within the acceptance zone defined by the upper and lower limit patterns contained in memories 54 and 56. More particularly, the outputs of magnitude comparators 78 and 108 are applied by way of a pair of manually enabled gates 136 and 138 and an OR-circuit 140 to a counter 142 which counts down from ten in response to pulses from comparators 78 and 108. Counter 142 also drives a second similar counter 144. The contents of counter 142 are also applied by way of a units percentage selector 146 to a percentage fit threshold unit 148. Similarly, the contents of counter 144 are applied via a tens percentage selector 150 to threshold unit 148.

By properly adjusting selectors 146 and 150, a selected percentage of the pulses emitted by either comparator 78 or comparator 108 can be applied to the threshold unit 148. Each pulse from comparator 78 or 108 indicates a "no fit" condition and is applied to decrement the contents of counters 142 and 144. Therefore, the numbers in the counters actually reflect the number of "fits."

When the number of pulses received from the comparators is less than a predetermined amount (indicating a predetermined number of "fits"), unit 148 emits a signal to turn on an indicator light 152, thereby notifying the operator that the incoming signal has the requisite number of "fits" and is, therefore, similar to the preceding signals. A reset pulse generator 154 resets unit 148 after each such indication.

It will be apparent from the preceding description, then, that the subject pattern recognition system provides an accurate distribution pattern of a series of measured parameters, using a statistical comparison technique. It also compares each series with data developed by preceding measurements to enable the operator to determine whether or not the measured parameters belong to the same set. Finally, the system adapts itself continuously and dynamically to long term changes in the measured parameter.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim:

1. A pattern recognition system comprising
A. a first memory for storing data representing an upper limit distribution pattern of a series of measurements on a parameter,
B. a second memory for storing data representing a lower limit distribution pattern of a series of measurements on the same parameter,
C. a third memory for storing new data representing a distribution pattern of additional measurements on the same parameter, and
D. means for comparing the contents of said third memory with the contents of said first memory and with the contents of said second memory, said comparing means emitting a signal which reflects when each number at an address in said third memory lies between the numbers contained at the corresponding addresses of said first and second memories.

2. A pattern recognition system as defined in claim 1 and further including
A. means for substituting the number contained at each address of said third memory for the number contained at the corresponding address of said first memory when the former number is larger than the latter number, and
B. means for substituting the number contained at each address of said third memory for the number contained at the corresponding address of said second memory when the former number is less than the latter number so that the upper and lower limit distribution patterns define in between them an acceptance zone which gradually expands in response to long term changes in the parameter being measured.

3. A pattern recognition system as defined in claim 2 and further including
A. means for periodically decrementing the contents of said first memory by a selected amount, and
B. means for periodically incrementing the contents of said second memory by a selected amount so that the acceptance zone both expands and contracts in response to said long term changes in the measured parameters.

4. A pattern recognition system as defined in claim 3 and further including means for decrementing the contents of said third memory by a selected amount so as to adjust the percentage contribution of the most recent series of parameter measurements to the distribution pattern contained in said third memory.

5. A pattern recognition system as defined in claim 1 and further including a threshold control section for actuating said comparing means after a selected number of measurements on a parameter.

6. A pattern recognition system as defined in claim 1 and further including a threshold control section for actuating said comparing means when the number contained at actuating address of said third memory exceeds a predetermined magnitude.

7. A pattern recognition system as defined in claim 1 and further including indicating means responsive to signals from said comparing means, said indicating means signalling an operator when said comparing means has sensed that a selected number of the numbers contained at the addresses of said third memory lie between the numbers contained at the corresponding addresses of said first and second memories.

8. A pattern recognition system as defined in claim 7 and further including display means connected to display the contents of said memories on a time-share basis so as to yield a simultaneous visual presentation of all the distribution patterns contained in said memories.

9. A pattern recognition system comprising

A. means for measuring a parameter,

B. a first memory having a plurality of memory addresses,

C. means for storing the number of occurrences of each different parameter measurement at a different address of said first memory so as to build up to said first memory a distribution pattern of parameter measurements, and D. means for decrementing the contents of said first memory so as to selectively adjust the percentage contribution of the most recent series of parameter measurements t the distribution pattern built up in said first memory.

10. A pattern recognition system as defined in claim 9 and further including

A. a second memory containing numbers reflecting the upper limit distribution pattern of the measurements on the same parameter, B. a third memory containing numbers reflecting the lower limit distribution pattern of the measurements on the same parameter, said limit patterns defining an acceptance zone between them, C. means for comparing the number contained in each address of said first memory with the number contained at the corresponding address of said second memory, said comparing means emitting an electrical signal showing when the former number exceeds the latter number, D. means for comparing the number contained at each address of said first memory with the number contained at the corresponding address of said third memory, said comparing means emitting an electrical signal showing when the former number is less than the latter number, and E. indicating means responsive to said electrical signals for measuring the number of times the numbers at the addresses of said first memory fall between the numbers at the corresponding addresses of said second and third memories so as to indicate when the distribution pattern built up in said first memory fits sufficiently within the acceptance zone defined by the patterns contained in the second and third memories.

11. A pattern recognition system as defined in claim 10 and further including means for substituting the number contained at each address of said first memory for the number contained at the corresponding address of said second or third memory whenever the number contained in the first memory is not between the numbers contained at the corresponding addresses of said second and third memories so as to expand said acceptance zone to accommodate changes in the pattern built up in said first memory.

12. A pattern recognition system as defined in claim 11 and further including

A. means for periodically decrementing the contents of said second memory by a selected amount, and B. means for periodically incrementing the contents of said third memory by a selected amount so that said acceptance zone also contracts in response to long term changes in the parameter being measured.

13. A pattern recognition system as defined in claim 12 and further including a threshold control section for actuating said incrementing and decrementing means only after an adequate distribution pattern has been built up in said first memory.

14. A pattern recognition system comprising

A. means for measuring a parameter,

B. a first multiaddress memory,

C. means for adding different parameter measurements at different addresses in said memory so that each memory address accumulates the number of occurrences of a particular parameter measurement, D. means for periodically subtracting a selected percentage of the contents of each first memory address, E. a second addressable recirculating memory for storing numbers reflecting the upper limit distribution pattern of measurements on the same parameter, F. means for periodically subtracting from the contents of each second memory address a selected percentage of the number contained at that address, G. a third addressable recirculating memory for storing numbers reflecting the lower limit distribution pattern of measurements on the same parameter, said upper and lower limit patterns defining an acceptance zone between them, H. means for adding to the contents of each third memory address a selected percentage of the number contained at that address, I. a first magnitude comparator for comparing the number contained at each address of said first memory with the number contained at the corresponding address of said second memory, said comparator emitting an output signal whenever the former number exceeds the latter number, J. a second magnitude comparator for comparing the number contained at each address of said first memory with the number contained at the corresponding address of said third memory, said second comparator emitting an output signal when the former number is less than the latter number, K. means for substituting the number contained at each address of said first memory for the number contained at the corresponding address of said second memory whenever an output signal from said first comparator indicates that the former number is larger than the latter number, L. means for substituting the number contained at each address of said first memory for the number contained at the corresponding address of said third memory whenever said second comparator indicates that the former number is less than the latter number, M. counting means responsive to the signals from said comparators for counting each time the number at an address of said first memory falls between the numbers contained at the corresponding addresses of said second and third memories, and N. an indicator for indicating when said counting means has reached a selected count so as to apprise an operator that the pattern contained in said first memory fits sufficiently within said acceptance zone.

15. A pattern recognition system as defined in claim 14 wherein

A. said second memory comprises a subtracter, a delay line and a first shift register connected in a closed loop, and B. said means for subtracting numbers from said second memory includes means for periodically gating a selected number of the most significant bits of the word contained in said first shift register to said subtracter for subtraction from a corresponding word of the least significant bits in said number.

16. A pattern recognition system as defined in claim 15 wherein

A. said third memory comprises an adder, a delay line and a second shift register connected in a closed loop, and B. said means for adding numbers to said third memory includes means for periodically gating a selected number of the most significant bits of each word contained in said second shift register to said adder for being added to a corresponding number of the least significant bits in said word.

17. A pattern recognition system as defined in claim 16 wherein each said gating means comprises A. an adjustable scale selector for connection to a selected stage of the associated first or second register for reading out data from that stage,
B. a gate connected, when enabled, to circulate said data from said stage to the associated adder or subtracter,
C. means for periodically enabling said gate, and
D. an adjustable counter which
1. counts clock pulses, and
2. is connected to disable said gate after a selected number of clock pulses.

* * * * *

PO-1050
(5/69)

UNITED STATES PATENT OFFICE
CERTIFICATE OF CORRECTION

Patent No. 3,623,015 Dated 11/23/71

Inventor(s) Herbert Schmitz et al

It is certified that error appears in the above-identified patent and that said Letters Patent are hereby corrected as shown below:

| | |
|---|---|
| Column 2, line 61 | Change "measure" to --measured--. |
| Column 3 line 12 | After "patterns" insert -- taking place over an extended period. At the same time, the limit patterns are expanded as described above to conform to expansion in the input patterns. -- |
| Column 3 line 47 | Change "contends" to --contents--. |
| Column 4 line 36 | Change "system" to --systems--. |
| Column 6 line 29 | Take out "During the third distribute pattern indicated by curve $S_3$ in FIG. 2C. -- |
| Claim 6 Col. 10 line 69 | Change "actuating" to --any--. |
| Claim 15 Col. 12 line 62 | Change "word" to --number--. |
| Claim 15 Col. 12 line 63 | Change "number" to --word--. |

Signed and sealed this 6th day of June 1972.

(SEAL)
Attest:

EDWARD M.FLETCHER,JR.
Attesting Officer

ROBERT GOTTSCHALK
Commissioner of Patents